(No Model.)
C. DORN.
APPARATUS FOR REFINING OILS.
No. 469,498. Patented Feb. 23, 1892.
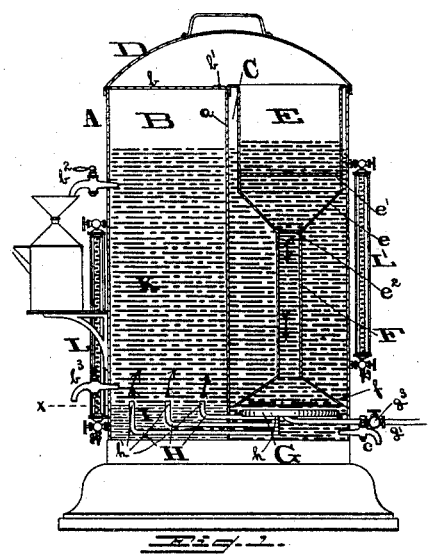
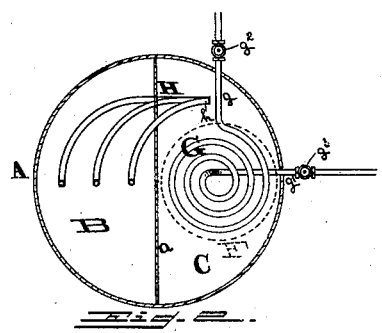
WITNESSES
W. H. Graeff
O. N. Sisson
INVENTOR
Christian Dorn.
By his Attorney,
Wm. S. Powell.

UNITED STATES PATENT OFFICE.

CHRISTIAN DORN, OF PHILADELPHIA, PENNSYLVANIA.

APPARATUS FOR REFINING OILS.

SPECIFICATION forming part of Letters Patent No. 469,498, dated February 23, 1892.

Application filed July 3, 1891. Serial No. 398,391. (No model.)

*To all whom it may concern:*

Be it known that I, CHRISTIAN DORN, a citizen of the United States, residing at Philadelphia, in the county of Philadelphia and State of Pennsylvania, have invented certain new and useful Improvements in Apparatus for Refining Oils, of which the following is a specification.

My invention has relation to purifying organic or mineral lubricating-oils, particularly after the same have served the purpose for which intended, and has for its object to provide an improved method whereby such purification is accomplished.

Heretofore the purification of oil of the character mentioned has generally been sought to be accomplished through the heating of the impure oil and its subsequent passage through water, upon the surface of which water the oil rests and is allowed to settle. The objections to this method are, first, that the heated oil, which is partly purified, has to pass through the sediment or settlings of the already supernatant oil, and becomes thereby polluted again and rendered as impure as before, and, second, unless the level of the supernatant oil is kept equal to or lower than that of the impure oil the pressure of the former forces the water into and causes it to be boiled with the oil last mentioned, rendering the same milky and unfit for use, the water therein tending to rust the bearings to which the oil is applied.

My invention consists in leading the heated oil into the chamber containing the water at a point above, instead of below, the level of the water, avoiding the objectionable passage of such oil through the sediment of the already supernatant oil and the forcing of such water into the chamber in which is contained the dirty oil. Thus all foreign matter with which the oil while performing its function has become impregnated may be entirely eliminated therefrom and the same restored to its original state and fit for use again, without danger of injury to the bearings which it is desired to lubricate.

Referring to the accompanying drawings, Figure 1 is a vertical section of the improved apparatus; and Fig. 2 a transverse section thereof, showing certain portions in plan view.

In said drawings, A represents the tank or reservoir, the same being divided by the partition $a$ into the compartments B and C, and is provided with the cover D. The compartment B is for the storage of the purified oil, the same being allowed to settle on the water I therein, said compartment having the lid $b$, which is hinged at $b'$. Compartment C has therein the oil-heating apparatus and affords storage for the oil after being heated and before gaining access to compartment B.

E is the receiver for the dirty oil, which latter is placed therein as occasion requires, said receiver being located in the upper part of said compartment C and having in its funnel-shaped bottom $e$ the sieves or strainers $e'$ $e^2$, through which such dirty oil passes and drops through the pipe F to the lower part of compartment C, as shown by the arrows. The pipe F at its lower end terminates in a flaring mouth or fender $f$, the latter being located quite close to the bottom of compartment C and having thereunder the flat volute steam-coil G, said coil being provided with the inlet $g$ and the outlet $g'$, each of which having therein a valve $g^2$ $g^3$. By reason of the relative arrangement of the coil and fender the impure oil from the pipe F is brought immediately into contact with the coil and is heated to such extent as to secure the greatest possible freedom by this means of the oil from all deleterious matters, the fender $f$ at the same time serving to confine the impure oil to the vicinity of the heater until its gravity has been reduced to the proper extent, whereupon it ascends in the compartment C and makes room for the heavier dirty oil from pipe F.

H are pipes leading from the compartment C into the compartment B, the inlet ends $h$ of said pipes being located below the plane of the edge of the fender $f$ and are lower than the outlet ends $h'$ thereof, said ends $h'$ projecting upwardly into the compartment B above the level of the water I therein. Consequently after being heated to the proper degree by the coil or heater G the oil enters these pipes at the ends $h$, as shown by the arrows, and is conducted thereby, when the height of the oil in compartment C is sufficient to cause the exertion of the requisite pressure in the oil in said pipes, into the compartment B and above the level $x$ of the water aforementioned, said oil finding exit through the outlet ends $h$ of the pipes H, as shown by the arrows. In this position the oil is allowed to settle, the sediment therefrom being precipitated into the water I, and is drawn off therewith, when it is desired to cleanse the compartment B, through a cock, which latter does not, however, appear in the drawings.

L L' are the gages for the respective compartments, the compartment B having the cocks or spigots $b^2$ $b^3$ for drawing off the refined oil, and compartment C being provided with the cock $c$ for drawing off the residuum of the oil which has previously been subjected to the heating process. The location of the ends $h$ of the pipes near the bottom of compartment C, said ends being, as shown, outside the peripheral line of the fender $f$, obviates the necessity for there being any great depth of oil remaining unused, while the location of the ends $h'$ of said pipes above the water-level avoids the passage of the heated oil through the water and the disturbance of and the carrying of the sediment back into the purified oil. Furthermore, this location of the discharge ends of the pipes H above the water-level effects the discharge of the refuse alone through the cock $c$ when the latter is opened for cleansing compartment C, such refuse in this event being subjected to the pressure of the unrefined oil only in said compartment, whereas, on the other hand, were said discharge ends below the level of the water the pressure of the refined oil on the water would force it into the compartment C, rendering milky the oil therein, and finally through the cock $c$, which is undesirable. By reason of the small quantity of water in the compartment B the capacity of the same for refined oil is increased without necessitating the enlargement of the dimensions of the tank or reservoir.

What I claim as my invention is as follows:

1. In an apparatus for refining oils, a tank or reservoir divided into compartments, an oil-heater in one of said compartments, the other compartment having water and a supernatant stratum of oil therein, and communicating pipes leading from the compartment first mentioned to the latter compartment and discharging above the water-level.

2. In an apparatus for refining oils, a tank or reservoir divided into compartments, an oil-heater in one of said compartments, a fender above said heater and operating to confine the impure oil to the vicinity of the heater, the other compartment having water and a supernatant stratum of oil therein, and communicating pipes leading from the compartment first mentioned to the latter compartment and discharging above the water-level.

3. In an apparatus for refining oils, a tank or reservoir divided into compartments, a receiver in one of said compartments, a pipe leading from said receiver and terminating in a flaring mouth or fender, an oil-heater below the latter, said mouth or fender operating to confine the impure oil to the vicinity of the heater, the other compartment having therein water and a supernatant stratum of oil, and communicating pipes leading from the first to the last mentioned compartment and discharging above the water-level.

4. In an apparatus for refining oils, a tank or reservoir divided into compartments, a receiver in one of said compartments, a pipe leading from said receiver and terminating in a flaring mouth or fender, a volute oil-heating steam-coil below the latter, said mouth or fender operating to confine the heated oil to the vicinity of the coil, the other compartment having therein water and a supernatant stratum of oil, and communicating pipes leading from the first to the last mentioned compartment and discharging above the water-level.

In testimony whereof I have hereunto set my hand this 30th day of June, A. D. 1891.

CHRISTIAN DORN.

Witnesses:
R. DALE SPARHAWK,
WM. H. POWELL.